United States Patent
Wu et al.

(10) Patent No.: US 6,760,087 B2
(45) Date of Patent: Jul. 6, 2004

(54) MULTI-DOMAIN VERTICAL ALIGNMENT LIQUID CRYSTAL DISPLAY

(75) Inventors: Ivan Yang-En Wu, Taipei (TW); Po-Lun Chen, Chiayii (TW)

(73) Assignee: AU Optronics Corporation, Hsinchu (TW)

( * ) Notice: Subject to any disclaimer, the term of this patent is extended or adjusted under 35 U.S.C. 154(b) by 4 days.

(21) Appl. No.: 10/055,545

(22) Filed: Jan. 22, 2002

(65) Prior Publication Data

US 2003/0058394 A1 Mar. 27, 2003

(30) Foreign Application Priority Data

Sep. 21, 2001 (TW) ........................................ 90123278 A

(51) Int. Cl.[7] .............................................. G02F 1/1337
(52) U.S. Cl. ...................................... 349/130; 349/129
(58) Field of Search ................................ 349/129, 130, 349/122, 123, 106, 141

(56) References Cited

U.S. PATENT DOCUMENTS 6,008,875 A * 12/1999 Ikeno et al. ................. 349/139
6,424,396 B1 * 7/2002 Kim et al. ................... 349/130
6,485,997 B2 * 11/2002 Lee et al. ..................... 438/30

* cited by examiner

Primary Examiner—Robert H. Kim
Assistant Examiner—David Y Chung
(74) Attorney, Agent, or Firm—J.C. Patents

(57) ABSTRACT

A multi-domain vertical alignment liquid crystal display, having a substrate with a color filter, a liquid crystal layer and a thin-film transistor array substrate. The thin-film transistor array substrate has an array of thin-film transistors and pixel electrodes. The pixel electrodes have a plurality of protrusions and slits, and a dielectric layer with a planarized surface covering the pixel electrodes. Therefore, the dielectric layer on the protrusion is thinner. Or alternatively, the protrusions are exposed. The exposed protrusions being alternately arranged with the slits and the dielectric layer result in a planarization effect, and have the function of twisting the electric field generated by the pixel electrodes. The liquid crystal molecules are thus inclined towards different directions to divide the liquid crystal layer of the same pixel electrode into multi-domains.

16 Claims, 6 Drawing Sheets

MULTI-DOMAIN VERTICAL ALIGNMENT LIQUID CRYSTAL DISPLAY

CROSS-REFERENCE TO RELATED APPLICATION

This application claims the priority benefit of Taiwan application serial no. 90123278, filed Sep. 21, 2001.

BACKGROUND OF THE INVENTION

1. Field of the Invention

The invention relates in general to a liquid crystal display (LCD), and more particularly, to a multi-domain vertical alignment (MVA) liquid crystal display.

2. Description of the Related Art

Currently, the development of liquid crystal display is directed towards a large display quantity, a high brightness, a high contrast, a large viewing angle, a large area and a full color display. To resolve the problem of viewing angle, the displaying liquid crystal area of the liquid crystal display is divided into multiple domains, so that liquid crystal molecules are inclined towards different angles to increase the viewing angle of the liquid crystal display.

In the conventional multi-domain vertical alignment liquid crystal display, a thin-film transistor (TFT) array substrate and a substrate having a color filter are provided. A lower polarization plate and an upper polarization plate are provided under the TFT array substrate and on the substrate having a color filter, respectively. The upper and lower polarization plates allow only a vertical straight polarized light to pass. A liquid crystal layer is disposed between the upper and lower polarization plates. The direction of the long axis of the liquid crystal layer is vertical to the TFT array substrate and the substrate having the color filter. The long axis of the liquid crystal layer is parallel to the electric field, so that the rotation speed of the molecules is slow at the beginning of the rotation. When the direction of the long axis becomes vertical to the electric field, the rotation speed of the molecules is faster. Therefore, a pre-tilt angle is required control the aligning direction of the liquid crystal, so as to precisely control the inclining direction of the liquid crystal molecules. A commonly seen technique is forming slits and protrusions on two surfaces of the TFT array substrate and the substrate having the color filter.

Referring to FIG. 1, a conventional MAVLCD is shown. Pixel electrodes 101 and slits 102 are formed on a TFT array substrate 100, while the substrate having the color filter 104 has pixel electrodes 105, which includes a protrusion 106. After packaging the TFT array substrate 100 and the substrate having the color filter 104, there is a protrusion 106 on the TFT array substrate 100 between two slits 102. That is, the slits 102 and the protrusion 106 are alternately arranged without being positioned in the same vertical line. By applying a voltage, the liquid crystal molecules between the substrates 100 and 104 are inclined towards the same direction due to formation of the protrusion 106 and the slits 102.

Referring to FIG. 2, another conventional MAVLCD is shown. A TFT array substrate 200 having pixel electrodes 201 and slits 202a is provided. A substrate having a color filter 204 with pixel electrodes 205 and a slit 202b is also provided. After packaging the substrates 200 and 204, the slit 202b is between the slits 202a. That is, the slits 202a and the slit 202b are alternately arranged without being positioned in the same vertical line. By applying a voltage, the liquid crystal molecules between the substrates 200 and 204 are inclined towards a predetermined direction dependent to the slits 202a and 202b.

The conventional MVALCD uses slits or a combination of slits and protrusions to process surfaces of the TFT array substrate and the substrate having a color filter. The fabrication cost is high.

In addition, the misalignment of the slit and protrusion may occur while packaging the substrates. The quality of the liquid crystal display is seriously affected.

SUMMARY OF THE INVENTION

The present invention provides a multi-domain vertical array liquid crystal display, on which protrusions and slits are formed on the thin-film transistor array only. Therefore, the alignment of slits and protrusions on two substrates is not required. The quality of the liquid display is not affected by misalignment.

The multi-domain vertical array liquid crystal display further has a dielectric layer formed to cover the protrusions and slits. The dielectric layer on the protrusions is thinner, or alternatively, the pixel electrodes on the protrusions are exposed, so that the thin-film transistor array substrate is flat, and liquid crystal molecules are divided into multiple domains to display.

Accordingly, the present invention provides a multi-domain vertical array liquid crystal display, including a substrate having a color filter, a liquid crystal layer and a thin-film transistor array substrate. The thin-film transistor array substrate has thin-film transistors and pixel electrodes arranged in an array. The pixel electrode has a plurality of protrusions and slits thereon. A dielectric layer with a flat top surface is formed to cover the pixel electrodes, such that the dielectric layer on the protrusions is thinner than other positions. Or alternatively, the surfaces of the pixel electrodes on the protrusions are exposed. Since the dielectric layer on the protrusions is thinner, or the pixel electrodes on the protrusions are exposed, the electric potential on the protrusion is higher than that on other positions. By alternately arranging the protrusions and the slits and the formation of the dielectric layer, the pixel electrodes are planarized. Further, the electric field generated by the pixel electrodes is twisted, so that the liquid crystal molecules are inclined towards different directions. The liquid crystal layer on the same pixel electrode is divided into multiple domains to form the multi-domain vertical array liquid crystal display.

Both the foregoing general description and the following detailed description are exemplary and explanatory only and are not restrictive of the invention, as claimed.

DESCRIPTION OF THE PREFERRED EMBODIMENTS

Figure 1:
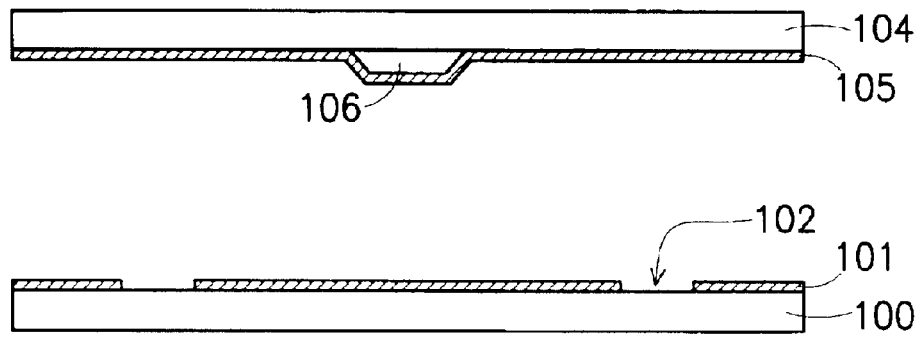
FIG. 1 shows a conventional multi-domain vertical array liquid crystal display.
Figure 2:
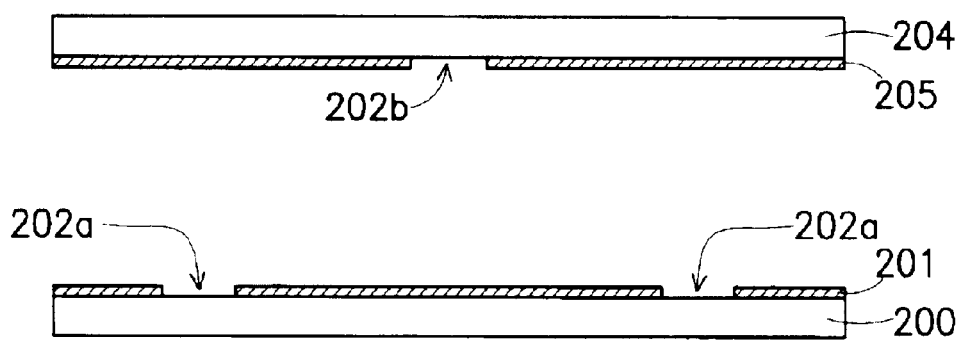
FIG. 2 shows another conventional multi-domain vertical array liquid crystal display.
Figure 3A:
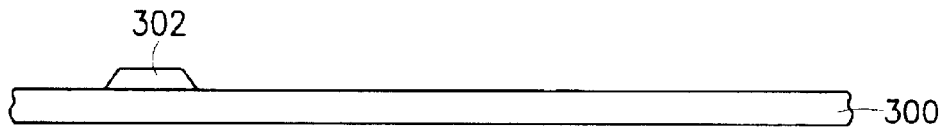
FIG. 3A to FIG. 3E show the fabrication process for forming a thin-film transistor array substrate in one embodiment of the present invention.

FIGS. 3A to 3E show an embodiment of a thin-film transistor array substrate provided by the present invention. Referring to FIG. 3A, a metal layer is formed on an insulation substrate 300. A first photomask process is performed to form a gate 302 on the insulation substrate 300. The metal layer includes a chromium layer.

Figure 3B:
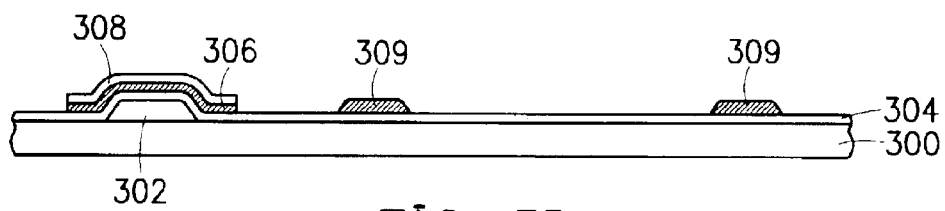

Referring to FIG. 3B, a dielectric layer 304 is formed on the insulation substrate 300. The material of the dielectric layer 304 includes silicon nitride ($SiN_x$). An amorphous silicon layer (a-Si) 306 and a doped amorphous layer ($n^+$ a-Si) 308 are formed on the dielectric layer 304. A second photomask process is performed to remain the amorphous silicon layer 306 and the doped amorphous silicon layer 308 on the gate 302 as a pre-foundation for source/drain region. In addition, a part of the amorphous silicon layer 306 on a predetermined position for forming a pixel electrode is remained. A protrusion 309 is formed by this remaining part of the amorphous silicon layer 306 during the second photomask process. The width and thickness of the protrusion 309 are about 10 microns and about 0.2–0.3 micron, respectively.

Figure 3C:
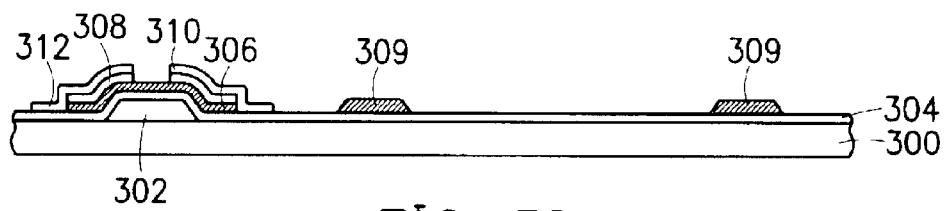

Referring to FIG. 3C, a metal layer such as a chromium layer is formed over the insulation substrate 300. A third photomask process is performed to remove the metal layer over the gate 302, the doped amorphous silicon layer 308 and the amorphous silicon layer 306, so that a discrete source region 310 and drain region 312 are formed.

Figure 3D:
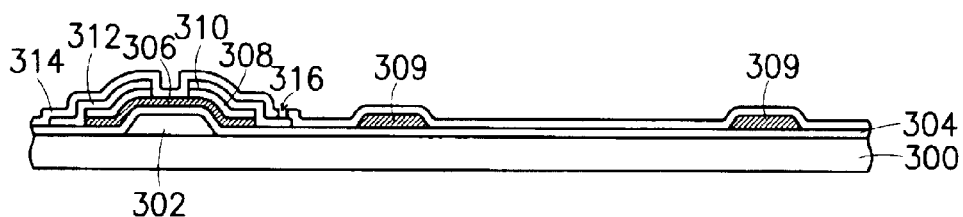

Referring to FIG. 3D, a passivation layer 314 is formed over the insulation substrate 300 after the formation of the source region 310 and the drain region 312 to prevent the thin-film transistor device from scratching and enhance the operation characteristic of the device. The passivation layer 314 includes a silicon nitride layer. A fourth photomask process is performed to remove a small area of the passivation layer 314 over the source region 310, so as to form a contact window 316 that exposes a part of the source region 310.

Figure 3E:
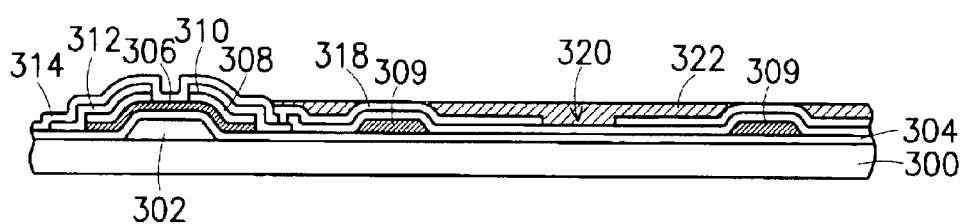

As the operation of thin-film transistor liquid crystal display uses the light valve theory to control whether light beams can transmit through the liquid crystal display, the pixel electrodes must possess conductive and light transparent characteristics. Thus, material such as indium tin oxide (ITO) is used for forming the pixel electrode 318 as shown in FIG. 3E. The indium tin oxide layer is formed by physical vapor deposition to fill the contact window 316 and to cover the insulation substrate 300 and the protrusion 309. A fifth photomask process is then performed to form the pixel electrode 318. In the fifth photomask process, at least a slit 320 is formed in the pixel electrode 318. The width of the slit 320 is about 8 microns to about 10 microns. The extension direction of the slit 320 is parallel to that of the protrusion 309, for example. However, according to specific requirement, the extension direction of slit 320 does not have to be parallel to that of the protrusion 309.

Further referring to FIG. 3E, a dielectric layer 322 with a flat top surface is formed on the pixel electrode 318 to planarize the pixel electrode 318. The material of the dielectric layer 322 includes silicon nitride ($SiN_x$), silicon oxide, or other organic material, for example. The dielectric layer 322 can either cover the protrusions 309 with a very thin thickness, or allow the protrusions 309 to be exposed. By the difference in thickness of the dielectric layer 322, the electric field generated on the pixel electrode 318 is effectively twisted. The liquid crystal molecules on the pixel electrode 318 are thus inclined towards different directions due to the different electric field.

Figure 4:
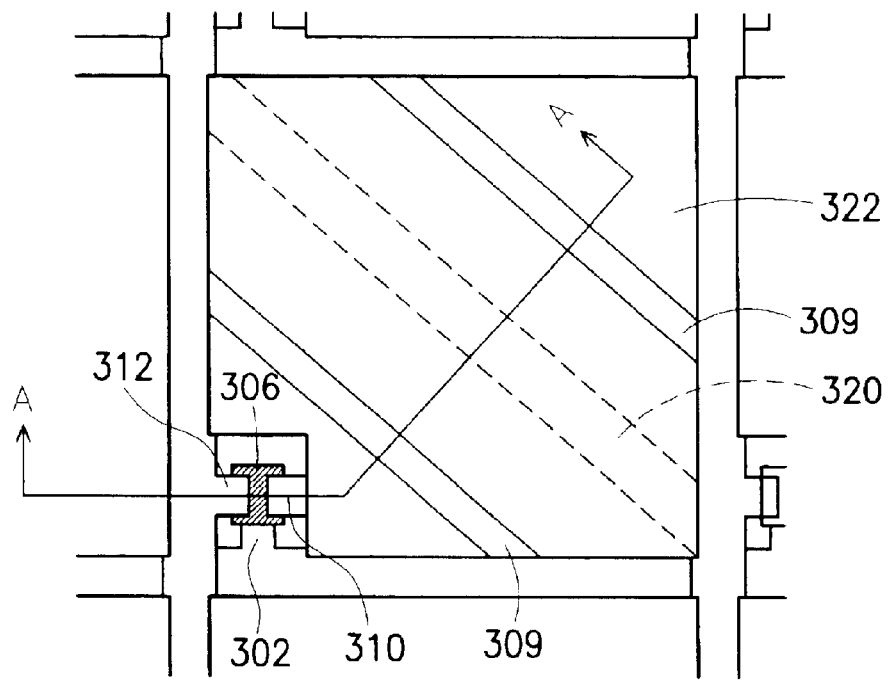
FIG. 4 shows a top view of pixels in a multi-domain vertical array liquid crystal display in one embodiment of the present invention.
Figure 5:
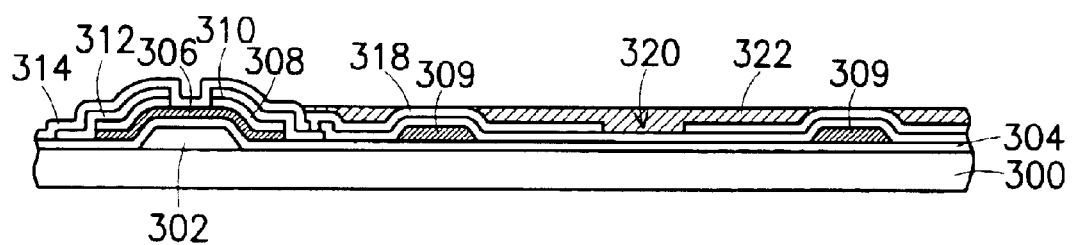
FIG. 5 shows cross sectional view cutting along the line A—A in FIG. 4.

Referring to FIGS. 4 and 5, FIG. 4 shows a top view of a pixel in a multi-domain vertical alignment liquid crystal display in one embodiment of the present invention, and FIG. 5 shows a cross section cutting along the line A—A in FIG. 4. The thin-film transistor including the gate 302, the source region 310, the drain region 312 and the amorphous silicon layer 306 located at a corner of the pixel electrode 318 is electrically connected to the pixel electrode 318. The pixel electrode 318 has at least one slit 320 alternately arranged with the protrusions 309 on the insulation substrate 300. The extension directions of the slit 320 and the protrusions 309 are parallel to each other, for example. In addition, the pixel electrode 318 on the protrusions 309 is also protruded.

The pixel electrode 318 is covered with a dielectric layer 322. The dielectric layer 322 including a planarized surface fills the slit 320. The pixel electrode 318 on the protrusions 309 is either exposed or covered with a very thin thickness of the dielectric layer 322. By the exposed pixel electrode 318, or the pixel electrode 318 covered with a very thin thickness of the dielectric layer 322, and the slit, the electric field can be twisted, so that the liquid crystal molecules over the insulation substrate 300 are inclined towards different directions.

Figure 6:
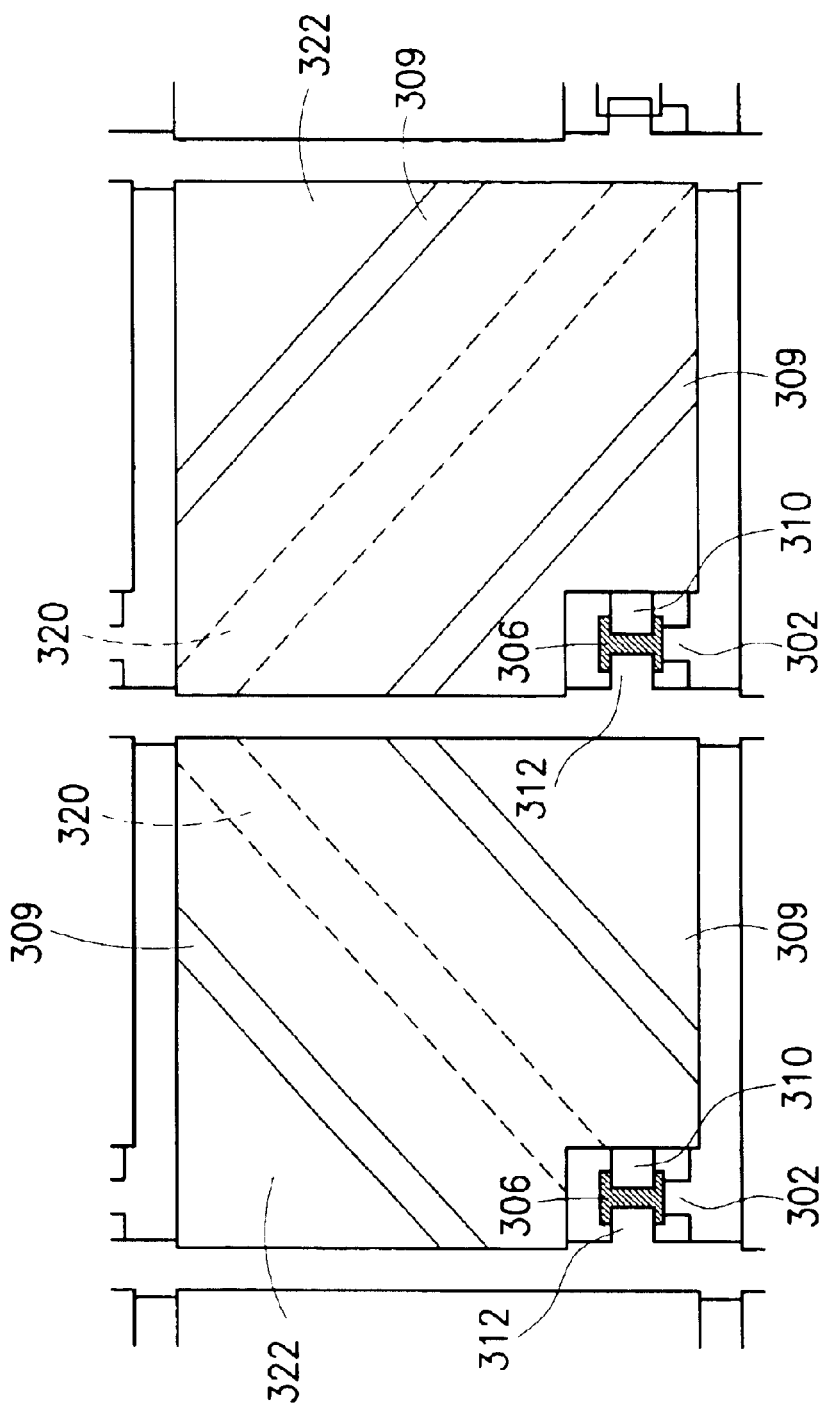
FIG. 6 shows the assembly of two pixels of the thin film transistor array in one embodiment of the invention.

Referring to FIG. 6, an assembly of two pixels on a thin-film transistor array substrate is shown. Two pixels are isolated by a storage capacitor (not shown). The extension directions of the slit 320 and the protrusions 309 are formed with various designs to obtain the wide viewing angle and high display quality.

Figure 7:
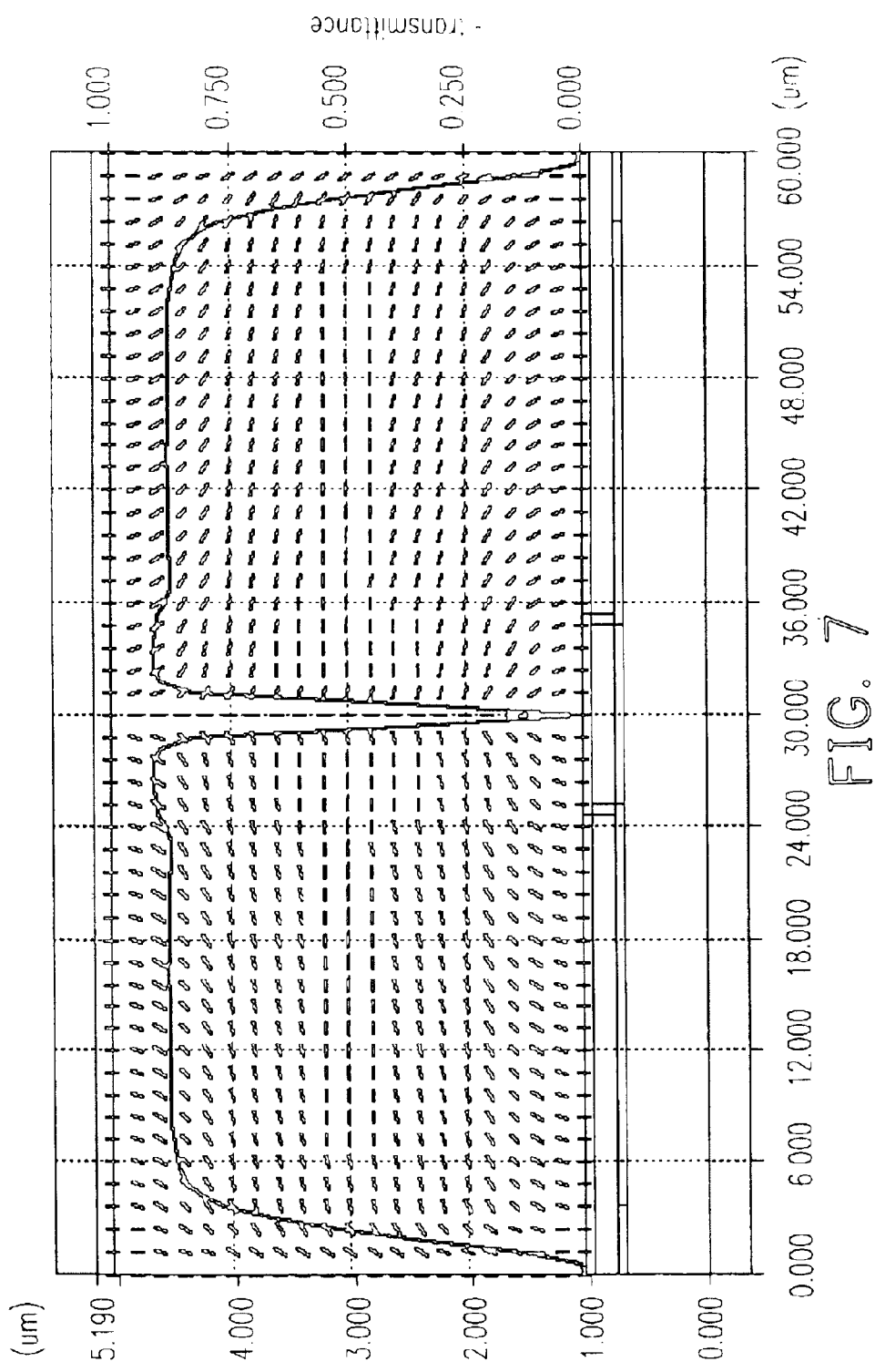
FIG. 7 shows the long axis distribution and the transmittance of the liquid crystal molecules on the protrusions and the slits in one embodiment of the invention.

Referring to FIG. 7, a schematic drawing of the long axis distribution and transmittance of liquid crystal molecules on the protrusion and the slit is shown. In FIG. 7, the horizontal axis indicates the position on the thin-film transistor array substrate, and the vertical axis indicates the transmittance. The transmittance of the liquid crystal molecules on the protrusion and the slit is almost zero, while the transmittance of the liquid crystal molecules over the dielectric layer is very uniform, of about 0.8 to about 0.9.

Figure 8:
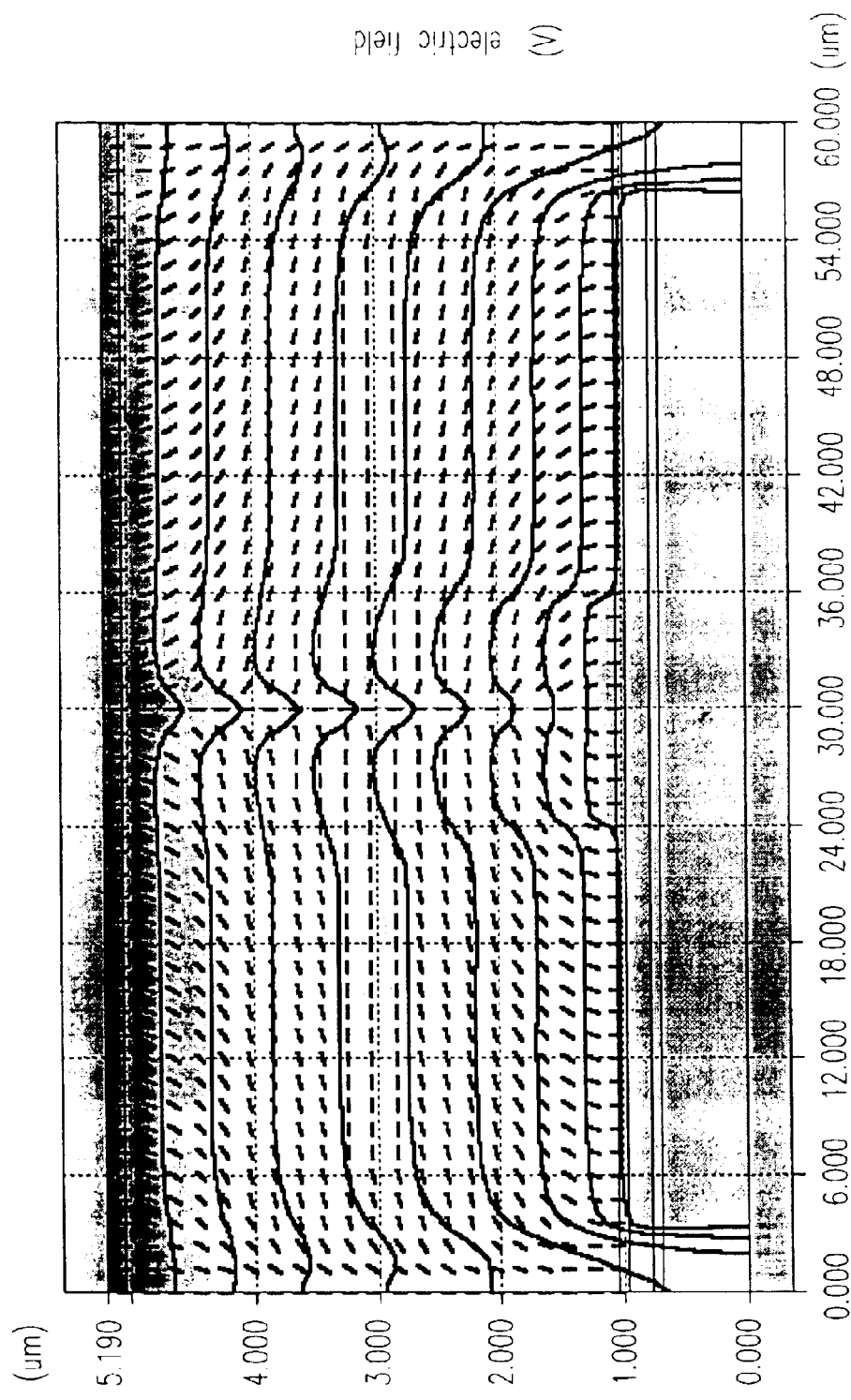
FIG. 8 shows the long axis distribution and the electric field of the liquid crystal molecules on the protrusions and the slits in one embodiment of the invention.

Referring to FIG. 8, a schematic drawing of the long axis distribution and electric field (the equi-potential lines) of liquid crystal molecules on the protrusion and the slit is shown. In FIG. 8, the relative positions of the protrusion (the central portion) and the slit (two sides of the drawing) are the same as those in FIG. 7. As shown in FIG. 8, the electric field on the protrusion is stronger than that on the slit. The electric field is twisted on the protrusion and the slit. To the whole liquid crystal display, the combination of the protrusion, the slit, and the dielectric layer is advantageous to control the inclination directions of the liquid crystal molecules.

Accordingly, the present invention has at least the following advantages.

1. Protrusion and slit are formed on the thin-film transistor array substrate, so that the misalignment of the thin-film transistor array substrate and the substrate having a color filter is avoided.

2. A dielectric layer is formed on the pixel electrode, so that the thin-film transistor array substrate is planarized. The spaces between the liquid crystal molecules are more uniform to enhance the display quality.

3. The dielectric layer formed on the pixel electrode causes the electric field generated by the pixel electrode to be twisted, so that the liquid crystal molecules are inclined towards different directions, and the liquid crystal molecules on the same pixel electrode are divided into multiple domains.

4. The extensions of the protrusion of different pixels can be designed into different directions, so that multiple domains in different directions can be formed for different pixels. By the combination of the pixels, a wide viewing angle is obtained.

5. The slit, the protrusion and the dielectric layer are compatible for five fabrication processes of the thin-film transistor liquid crystal display.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A multi-domain vertical alignment liquid crystal display, comprising at least:
    a first substrate, having a plurality of thin-film transistors, a plurality of protrusions and a plurality of pixel electrodes thereon, wherein the pixel electrodes formed over the protrusions have a plurality of slits, whereby the protrusions and the slits produce a multi-domain mechanism, and the first substrate further includes a planarized dielectric layer on the protrusions and the slits;
    a second substrate, having none of slit or protrusion for use to produce additional electric field; and
    a liquid crystal layer disposed between the first substrate and the second substrate.

2. The multi-domain vertical alignment liquid crystal display according to claim 1, wherein the first and second substrates include glass substrates.

3. The multi-domain vertical alignment liquid crystal display according to claim 1, wherein the first substrate includes a thin-film transistor array substrate.

4. The multi-domain vertical alignment liquid crystal display according to claim 1, wherein the second substrate has a plurality of black matrices and color filters.

5. The multi-domain vertical alignment liquid crystal display according to claim 1, wherein extension directions of the protrusions and the slits are parallel to each other.

6. The multi-domain vertical alignment liquid crystal display according to claim 1, wherein extension directions of the protrusions and the slits are not parallel to each other.

7. The multi-domain vertical alignment liquid crystal display according to claim 1, wherein the protrusions and the slits are alternately arranged.

8. The multi-domain vertical alignment array liquid crystal display according to claim 1, wherein the pixel electrodes on the protrusions are exposed while the dielectric layer is planarized.

9. The multi-domain vertical alignment array liquid crystal display according to claim 1, wherein the dielectric layer covers the pixel electrodes on the protrusions with a thickness thinner than that of the dielectric layer in other positions.

10. A thin-film transistor array substrate, comprising:
    a substrate;
    a plurality of thin-film transistors formed on the substrate to provide an electric field, wherein protrusions are also formed on the substrate;
    a plurality of pixel electrodes covering the protrusions and having a plurality of slits arranged with the protrusions to form multiple domains, wherein the slits and the protrusions are only disposed over the substrate but not on an opposite substrate against the substrate; and
    a dielectric layer, covering the pixel electrodes and the slits, the dielectric layer having a planarized surface.

11. The thin-film transistor array substrate according to claim 10, wherein the thin-film transistor array substrate includes a glass substrate.

12. The thin-film transistor array substrate according to claim 10, wherein extension directions of the protrusions and the slits are parallel to each other.

13. The thin-film transistor array substrate according to claim 10, wherein extension directions of the protrusions and the slits are not parallel to each other.

14. The thin-film transistor array substrate according to claim 10, wherein protrusions and the slits are alternately arranged with each other.

15. The thin-film transistor array substrate according to claim 10, wherein the pixel electrodes on the protrusions are exposed.

16. The thin-film transistor array substrate according to claim 10, wherein the dielectric layer covers the pixel electrodes on the protrusions with a thickness thinner than the dielectric layer in other positions.

* * * * *